United States Patent [19]
Sakaguchi et al.

[11] Patent Number: 5,149,545
[45] Date of Patent: Sep. 22, 1992

[54] CENTRAL MECHANISM OF TIRE VULCANIZER

[75] Inventors: Katsuyoshi Sakaguchi; Akira Hasegawa, both of Akunoura, Japan

[73] Assignee: Mitsubishi Jukogyo Kabushiki Kaisha, Tokyo, Japan

[21] Appl. No.: 669,524

[22] Filed: Mar. 14, 1991

[30] Foreign Application Priority Data

Mar. 26, 1990 [JP] Japan ................ 2-73224

[51] Int. Cl.⁵ ................ B29C 35/00; B29C 37/00
[52] U.S. Cl. ................ 425/35; 425/49; 425/51
[58] Field of Search ........... 425/35, 36, 48, 49, 425/51, 52, 39, 56, 58

[56] References Cited

U.S. PATENT DOCUMENTS

| | | | |
|---|---|---|---|
| 1,440,495 | 1/1923 | Richards et al. | 425/56 |
| 2,559,119 | 7/1951 | Frank | 425/48 |
| 3,790,656 | 2/1974 | Getz | 425/48 |
| 4,013,389 | 3/1977 | MacMillan | 425/36 |
| 4,022,554 | 5/1977 | MacMillan | 425/36 |
| 4,545,750 | 10/1985 | Sarumaru | 425/49 |
| 4,631,014 | 12/1986 | Drewel et al. | 425/49 |
| 4,846,649 | 7/1989 | Hasegawa et al. | 425/51 |
| 4,863,360 | 9/1989 | Chuchanis | 425/48 |
| 4,950,141 | 8/1990 | Maikuma et al. | 425/36 |

*Primary Examiner*—Willard Hoag
*Attorney, Agent, or Firm*—McAulay Fisher Nissen Goldberg & Kiel

[57] ABSTRACT

According to a central mechanism of a tire vulcanizer of the present invention, in a central mechanism of a tire vulcanizer in which a lower clamp ring holding a lower end portion of a bladder is fixed detachably to a lower ring having a passage of a vulcanizing medium, key-shaped holes are bored on the lower clamp ring, springs which press clamp rods which penetrate through the lower ring downward and a fluid pressure cylinder which pushes up the clamp rods against the spring force are provided, and the clamp rods are pushed up so as to release fixing of the lower clamp ring, and the lower clamp ring is removed by rotating the lower clamp ring by a predetermined angle from a state in which the lower clamp ring and the lower ring are fixed to each other by having nuts fixed at the upper ends of the clamp rods engaged with the key holes. Accordingly, the replacement operation of the bladder is automated, thus making it possible to improve the operation rate.

2 Claims, 6 Drawing Sheets

F I G. 7
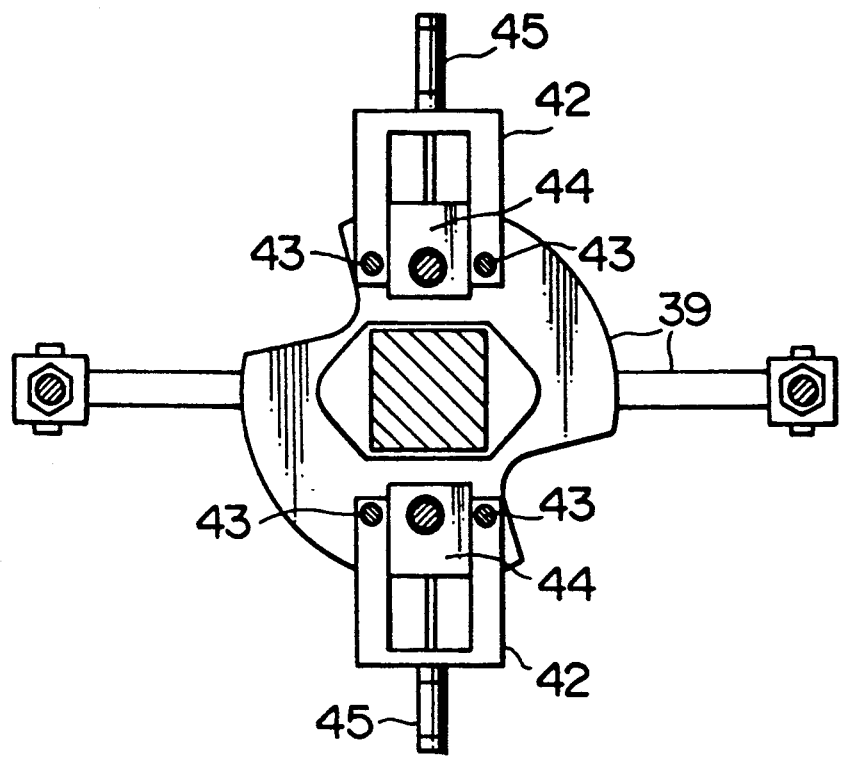
F I G. 8
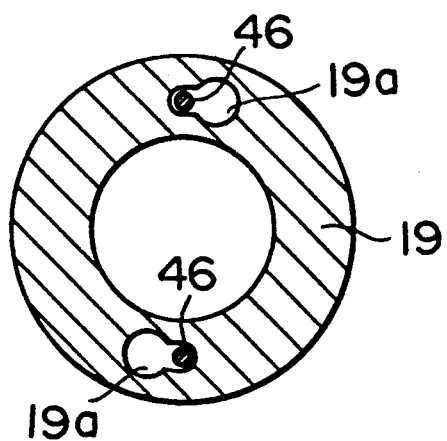

CENTRAL MECHANISM OF TIRE VULCANIZER

FIELD OF THE INVENTION AND RELATED ART STATEMENT

The present invention relates to a central mechanism of a tire vulcanizer.

In a conventional central mechanism of a tire vulcanizer of this sort, a bladder assembly in which an upper clamp ring and an upper bladder retainer are fixed with bolts on a bladder in advance and a lower clamp ring and a lower bladder retainer are fixed in a similar manner to the above has been suspended in a tire vulcanizer, and the bladder assembly is rotated humanly so that a female screw provided on the underside of the lower clamp ring is made to be screwed on to a male screw provided on the lower ring, thereby to fix or remove the bladder assembly.

However, such a conventional central mechanism had problems as described hereunder. That is:

(1-1) When much time is taken for fitting and removing the bladder, the operation rate is lowered and heat loss is also big during that period.

(1-2) Due to human operation on a high temperature portion, a question for the health has also arisen.

(2-1) Accordingly, it is preferable to substitute motive power for human power, so that the work may be accomplished in a short period of time, and also to adopt a remote control system.

(2-2) There is also a method in which the male screw of the lower ring is rotated by motive force using a gear and the like, but a space is restricted, the cost is high, and there is a problem in point of maintenance in addition to no contribution made to reduction in time.

OBJECT AND SUMMARY OF THE INVENTION

It is an object of the present invention which has been made in view of such circumstances to solve above-mentioned problems and to provide a central mechanism of a tire vulcanizer in which a bladder can be fitted and removed only by rotating the bladder by a very small angle after suspending the bladder utilizing the force of an existing fluid pressure cylinder as the motive force.

The construction of the present invention for attaining above-mentioned object is characterized in that, in a central mechanism of a tire vulcanizer in which a lower clamp ring holding a lower end portion of a bladder is fixed detachably to a lower ring having a passage of a vulcanizing medium, key holes each composed of a passing portion having a large diameter and a locking portion having a small diameter are bored in the lower clamp ring, and clamp rods penetrating the lower ring, springs which press the clamp rods downward and a fluid pressure cylinder which pushes up the clamp rods against the spring force are provided, and fixing of the lower clamp ring with the lower ring is released by pushing up the clamp rods by means of the fluid pressure cylinder from a state in which the lower clamp ring and the lower ring are fixed to each other by having nuts fixed at the upper end of the clamp rod being engaged with the locking portions of the key holes each having a small diameter, and thereafter, the lower clamp ring is rotated by a predetermined angle so as to position the upper ends of the clamp rods at the positions of the passing portions of the key holes each having a large diameter, thereby to remove the lower clamp ring.

The operation of the present invention is as follows.

(1-1) During tire vulcanization, the clamp rods hold the lower clamp ring by the resiliency of disc springs.

(1-2) The lower ends of the clamp rods are located in a space provided in the stopper, and the resiliency of the disc springs is all applied to the clamp rings.

(2-1) A fifth fluid pressure cylinder is operated and a stopper position is altered at the time of replacing the bladder, whereby the clamp rods compress the disc springs so as to generate a required gap from the lower clamp ring, thus making replacement possible.

Then, the stopper takes two positions by the operation of the fifth fluid pressure cylinder. Accordingly, the clamp rods show two behaviors as follows.

a. The clamp rods are energized downwards by the resiliency of the disc springs which are compressed in advance and apply a compression force to the lower clamp ring.

b. The disc springs are compressed further, thereby to raise the clamp rods and release the lower clamp ring.

The effects of the present invention are as follows.

(1) The bladder has been fitted and removed humanly, but exchange operation is automated by the present invention, and safety is improved.

(2) The bladder exchange time is reduced, the operation rate is improved, and heat consumption can be cut down.

(3) It is possible to modify a conventional apparatus only by adding simple components so that an economical tire vulcanizer may be provided, and good maintenance performance is obtainable.

BRIEF DESCRIPTION OF THE DRAWINGS

FIG. 7 is a sectional view taken along a line VII—VII in FIG. 2; and

FIG. 8 is a sectional view taken along a line VIII—VIII in FIG. 2.

DETAILED DESCRIPTION OF THE PREFERRED EMBODIMENTS

Figure 1:
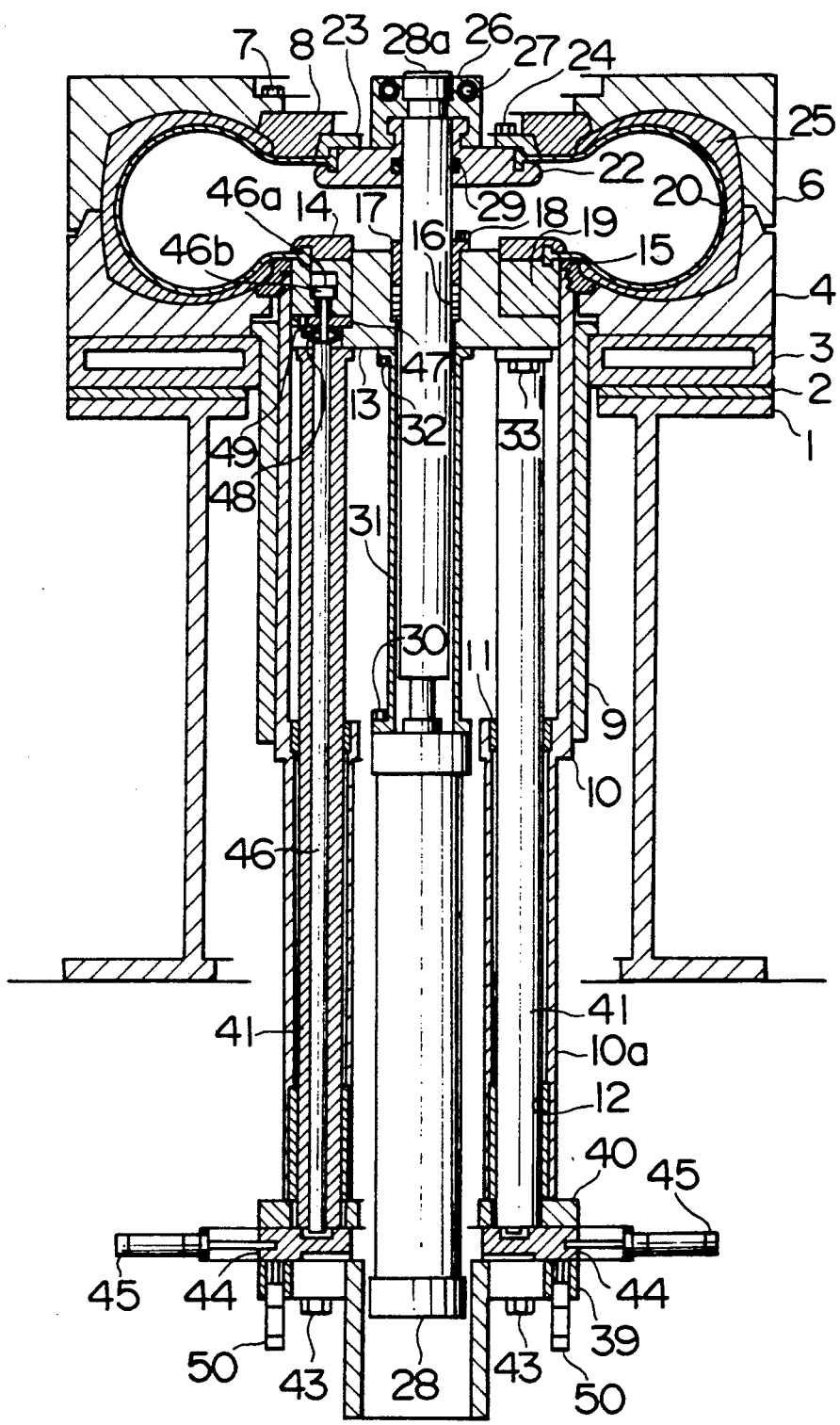
FIG. 1 is a front sectional view of a central mechanism of a tire vulcanizer according to an embodiment of the present invention.
Figure 2:
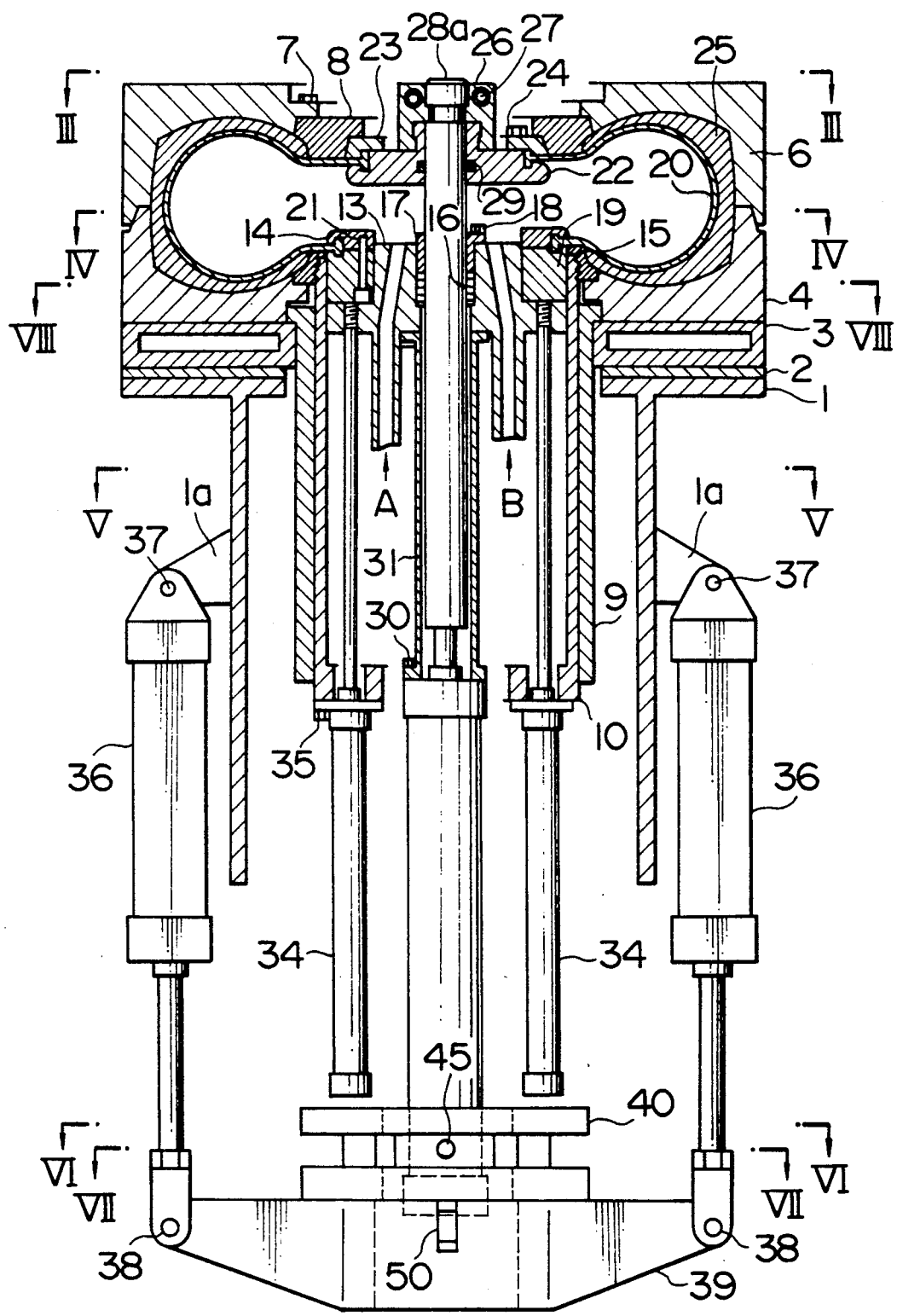
FIG. 2 is a side sectional view of FIG. 1.
Figure 3:
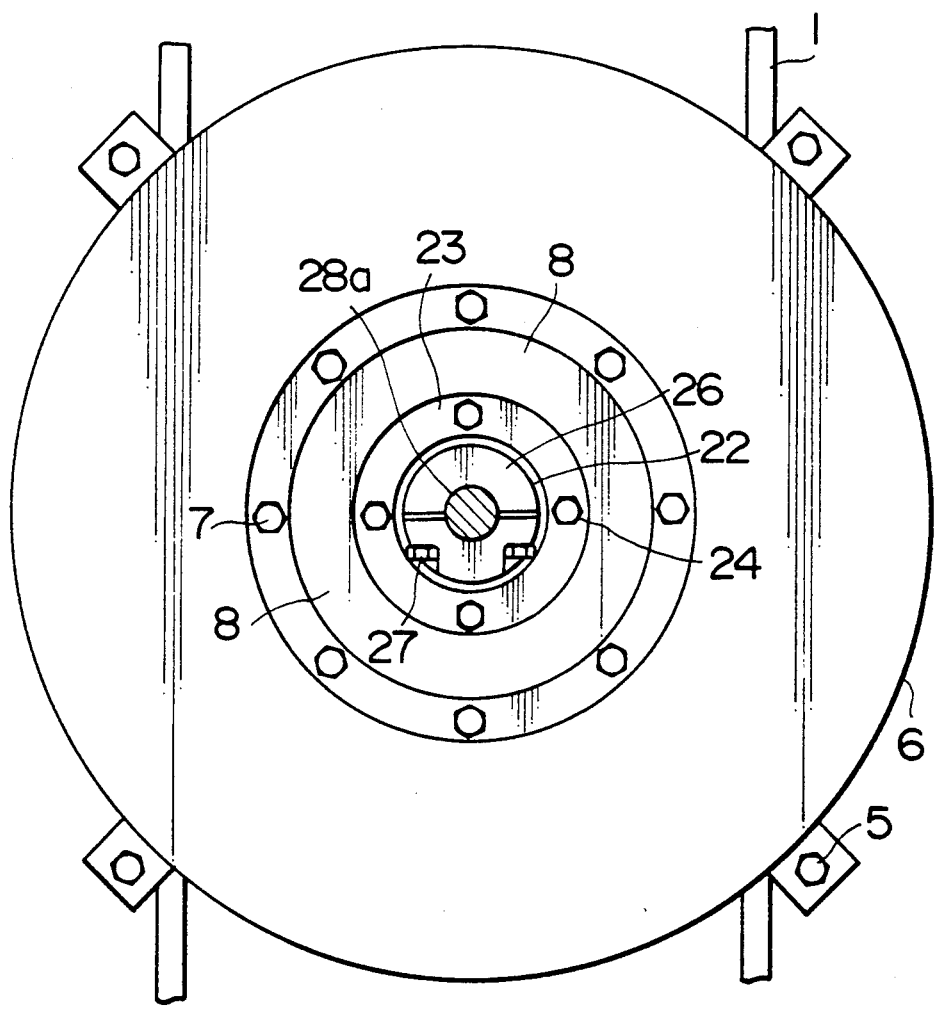
FIG. 3 is a sectional view taken along a line III—III in FIG. 2.
Figure 4:
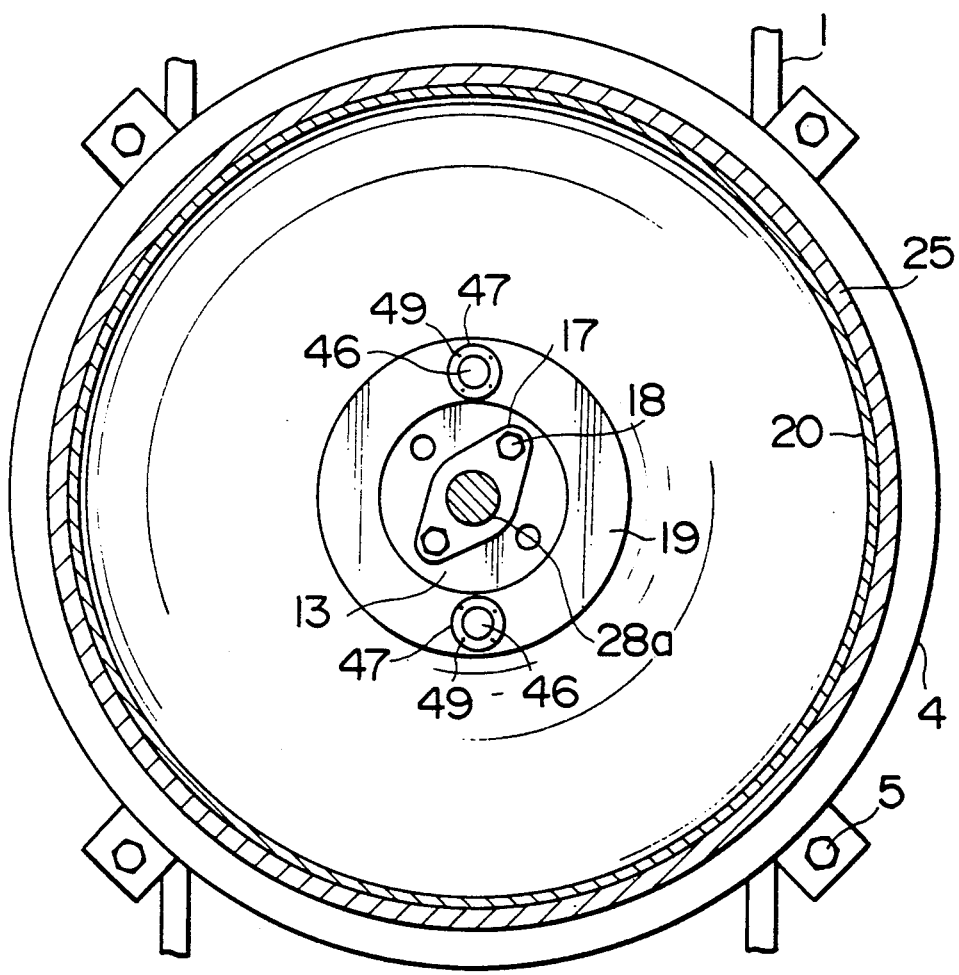
FIG. 4 is a sectional view taken along a line IV—IV in FIG. 2.
Figure 5:
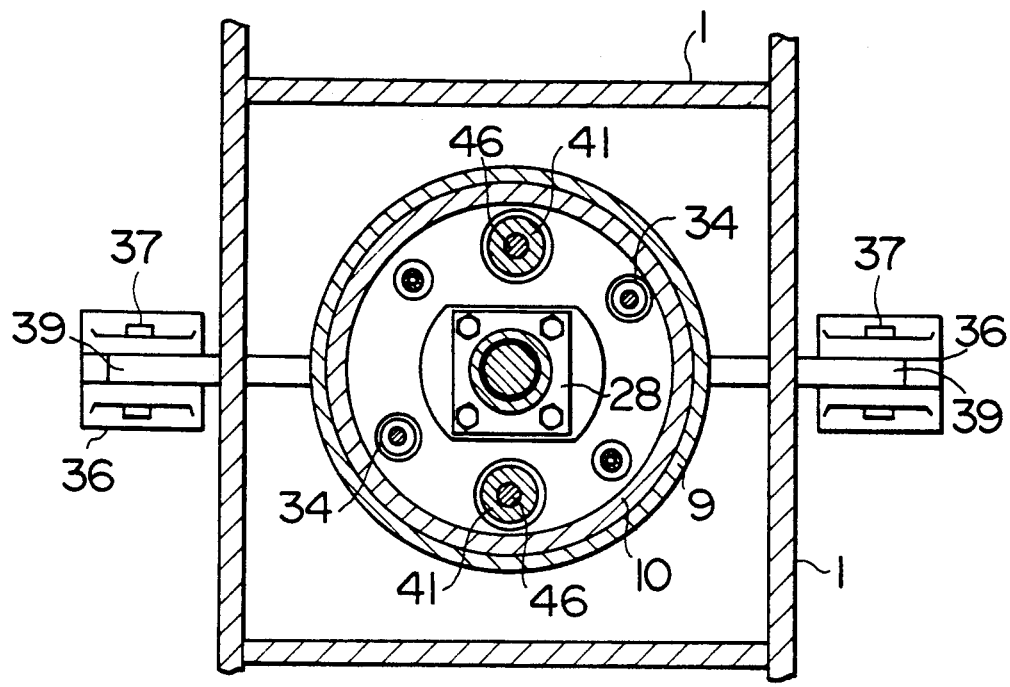
FIG. 5 is a sectional view taken along a line V—V in FIG. 2.
Figure 6:
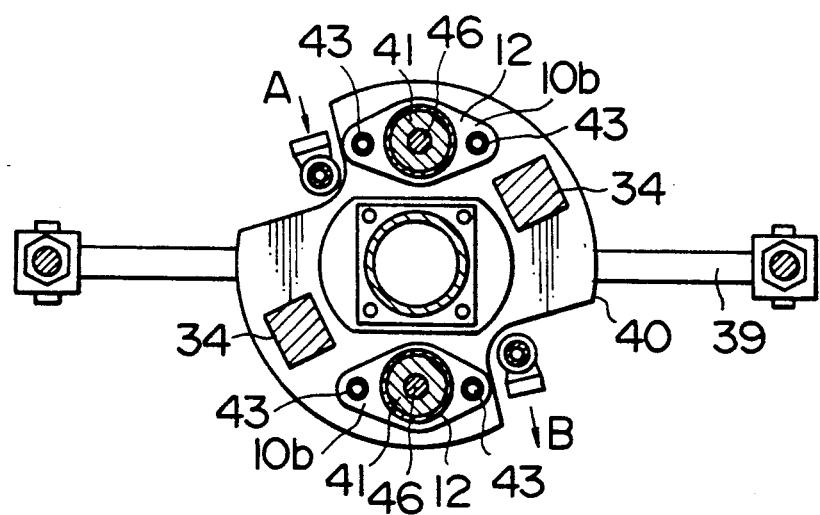
FIG. 6 is a sectional view taken along a line VI—VI in FIG. 2.

A central mechanism of a tire vulcanizer of the present invention will be described with reference to an embodiment shown in FIG. 1 thru FIG. 8.

In these drawings, a lower heating plate 3 is fixed onto an upper surface of a base 1 with bolts (not shown) through an adiabatic plate 2. A lower metallic mold 4 is fixed with bolts 5 onto the upper surface of the lower heating plate 3. A tapered portion is formed on the outer circumference of the bottom portion of an upper metallic mold 6, and the tapered portion is fitted to a tapered portion formed on the outer circumference of the upper part of the lower metallic mold 4. Further, an upper bead ring 8 is fixed with bolts 7 to the upper side of the inner circumference of the upper metallic mold 6.

The upper side of an outer circumference of an outer cylinder 9 is engaged with the lower heating plate 3, and an outer circumferential surface of an inner cylinder 10 is engaged loosely with the inner circumferential surface of the outer cylinder 9. Further, 10a denotes two cylinders which are joined with the inner cylinder 10, and outer circumferential faces of bushings 11 and 12 are engaged statically with the inner circumferential surface of the cylinder 10a. Furthermore, 13 denotes a lower ring and 14 denotes a bladder holder, and the inner circumferential surface of the inner cylinder 10 is engaged loosely with the outer circumferential surface of the lower ring 13, and screws provided on the upper part of the outer circumference of the inner cylinder 10 are screwed on to female screws provided on a lower bead ring 15. Further, a V packing 16 is inserted on the inner circumferential surface of the lower ring 13, and a packing retainer 17 is fixed by means of bolts 18. A lower end portion of a bladder 20 is fixed by the bladder holder 14 and bolts 21 on an upper surface of a lower clamp ring 19. The upper inner circumferential surface of the bladder 20 is fixed to an upper clamp ring 22 by a bladder holder 23 and bolts 24. Further, a vulcanizing medium is charged with pressure through a hole A of a pipe provided on the lower ring 13 and is discharged through a hole B. At that time, a tire 25 is heated and pressurized through the bladder 20, thus performing vulcanizing operation. Further, 26 denotes a two piece clamp, and the upper clamp ring 22 and a piston rod 28a of a first fluid pressure cylinder 28 are fixed with grooves formed on respective parts by fastening with bolts 27. Further, an 0-ring 29 is mounted on an inner surface of the upper clamp ring 22. The main body of the first fluid pressure cylinder 28 is fixed to a spacer 31 with a bolt 30, and the spacer 31 is fixed to the lower ring 13 with a bolt 32. Further, inner circumferential surfaces of bushings 11 and 12 are engaged loosely with outer circumferential surfaces of two pieces of rods 41, and a flange at the upper end thereof is fixed to the lower ring 13 with a bolt 33. Further, a main body flange of two pieces of second fluid pressure cylinders 34 is fixed to the inner cylinder 10 with a bolt 35, and a point screw portion of the piston rod is screwed on to a female screw provided on the lower surface of the lower ring 13. Further, upper parts of two pieces of third fluid pressure cylinders 36 are engaged loosely with lugs 1a which are formed in one body with the base 1 by pins 37, and point crevices of the piston rods are engaged loosely with a beam 39 with pins 38. Further, 43 denotes four pieces of bolts, and each bolt 43 penetrates a hole of the beam 39, a spacer 42 and a disc 40 from the bottom and is screwed on to a female screw provided on a lower end flange 10b of the inner cylinder 10. Further, a stopper 44 has a thickness which is a little thinner than that of the spacer 42.

Main body male screws of fourth fluid pressure cylinders 45 are screwed on to female screws provided on the spacers 42, and piston rod point male screws are provided on the stopper 44, and are screwed on to female screws. Upper ends of two pieces of clamp rods 46 are formed into male screws which are screwed on to nuts 46a, thus forming in one body form using pins 46b, and are engaged loosely with holes provided on disc spring retainers 47, inserted further into holes provided on the lower ring 13, and engaged loosely with inner surface holes of two pieces of rods 41. The lower end of the clamp rod 46 is made a little longer than the rod 41, and that portion is inserted into a recessed portion provided on an upper surface of the stopper 44. A plurality of disc springs 48 are prepressed using disc spring retainers 47 and bolts 49 and housed in the holes provided on the lower ring 13, and the resiliency thereof is applied to stepped portions provided on the clamp rods 46. The lower clamp ring 19 makes passing and fastening of the clamp rods 46 possible by providing key-shaped holes 19a each formed having a large diameter passing portion and a small diameter locking portion as shown in FIG. 8. The main body male screws of fifth fluid cylinders 50 are screwed on to female screws provided on the beam 39, the piston rod points thereof are fitted to grooves provided on the underside of the stopper 44, and the stopper 44 acts to suspend when the fourth fluid cylinders 45 are extended if the fifth fluid cylinders 50 are extended.

In the next place, the operation of the present apparatus will be described.

In FIG. 1 thru FIG. 8, it is assumed that the lower clamp ring 19 is applied with the resiliency of the disc springs 48 and fixed by the engagement of nuts 46a at the upper ends of clamp rods 46 with the locking portions of key holes 19a in clamp ring 19, and vulcanizing operation is performed continuously at present. In case the bladder 20 is damaged and is required to be replaced, second fluid pressure cylinders 34 are extended and the fourth fluid pressure cylinders 45 are compressed, and the fifth fluid pressure cylinders 50 are extended thereafter. Then, the stopper 44 is suspended when the fourth fluid pressure cylinders 45 are extended. When the second fluid cylinders 34 are compressed thereafter, the lower ends of the clamp rods 46 come in contact with the stopper 44, the disc springs 48 are compressed, and fixed nuts 46a at the upper ends of the clamp rods 46 are raised from the contact surface with the lower clamp ring 19. Then, removal operation is completed when the bladder assembly including the lower clamp ring 19 and the like is lifted up after first rotating it by a predetermined angle to a position where the nuts 46a at the upper ends of the clamp rods 46 pass through the passing portions of key holes 19a in the clamp ring. It is only required to perform an operation reverse the above when the bladder assembly is fitted.

We claim:

1. In a central mechanism of a tire vulcanizing apparatus including a bladder, a lower ring having a conduit for passage of a vulcanizing medium to the interior of said bladder, and a lower clamp ring detachably secured to said lower ring for removably securing a lower end portion of said bladder within said apparatus, wherein the improvement comprises:

said lower clamp ring having key-shaped holes formed therein, each of said holes having a large diameter passing portion and a small diameter locking portion;

said lower clamp ring being moveable relative to said lower ring between a first state and a second state;

clamp rods each having one end passing through a respective one of said holes in said lower clamp ring and engageable with a nut member, said nut member being sized to engage with the locking portion of said key hole when said lowerclamp ring is in its first state and to pass through the passing portion of said key hole when said clamp ring is in its second state;

spring means associated with said clamp rods and being operable to displace said rods in one direction to locate said nut members in engagement with the locking portions of said key holes when said lower clamp ring is in its first state thereby to prevent movement of said lower clamp ring to its second state; and fluid pressure cylinder means associated with said clamp rods and being operable to displace said rods in an opposite direction, against the force of said spring means, to disengage said nut members from the locking portions of said key holes and permit said lower clamp ring to be moved to its second state and be removed form said lower ring by passage of said nut members through the passing portions of said key holes for replacing said bladder.

2. The mechanism of claim 1, wherein said lower clamp ring is rotatably moveable relative to daid lower ring, said rotation of said lower clamp ring between its first and second states being through a predetermined angle.

* * * * *